United States Patent [19]
Tabor

[11] 4,069,810
[45] Jan. 24, 1978

[54] VACUUM SOLAR COLLECTORS

[76] Inventor: Harry Zvi Tabor, 13 Hameyasdim Street, Jerusalem, Israel

[21] Appl. No.: 674,948

[22] Filed: Apr. 8, 1976

[30] Foreign Application Priority Data

Apr. 24, 1975 Israel ............................. 47167

[51] Int. Cl.² ............................................. F24J 3/02
[52] U.S. Cl. ..................... 126/271; 237/1 A
[58] Field of Search ............... 126/270, 271; 237/1 A; 60/641

[56] References Cited

U.S. PATENT DOCUMENTS

| 1,068,650 | 7/1913 | Harrison | 126/271 |
| 2,917,817 | 12/1959 | Tabor | 126/270 |
| 3,875,926 | 4/1975 | Frank | 126/271 |
| 3,952,724 | 4/1976 | Pei | 126/271 |
| 3,961,619 | 6/1976 | Estes et al. | 126/270 |
| 4,002,160 | 1/1977 | Mather, Jr. | 126/271 |

FOREIGN PATENT DOCUMENTS 556,333  7/1923  France ............................. 126/271

OTHER PUBLICATIONS

Aloe Scientific, St. Louis, Mo., Catalog No. 103, p. 176, Item No. 18760 cited.
Elmer and Amend., N.Y., Catalogue 1907, p. 106, Item No. 2822 cited.

Primary Examiner—Kenneth W. Sprague
Assistant Examiner—James C. Yeung
Attorney, Agent, or Firm—Benjamin J. Barish

[57] ABSTRACT

A solar collector, comprises: a tubular housing of radiation-transparent material hermetically closed at one end; a smaller-diameter tubular absorber having a radiation-absorbing surface, the absorber being coaxially disposed within the tubular housing and hermetically closed at one end; the opposite ends of the tubular housing and absorber being sealed together, and the space between the two being evacuated; and heat-extracting means for passing a heat-exchange medium through said opposite end of the tubular absorber into the interior thereof to extract heat therefrom.

1 Claim, 4 Drawing Figures

VACUUM SOLAR COLLECTORS

BACKGROUND OF THE INVENTION

The present invention relates to solar collectors, and particularly to a novel form of evacuated solar collector.

Solar collectors comprise, in general, an absorber blackened to absorb radiation, and enclosed in a housing having a transparent window to allow the entry of solar radiation, the housing also providing some measure of thermal insulation to the absorber. Sometimes several transparent windows with intervening air spaces are used to increase the thermal insulation.

One method known for reducing heat loss from the absorber is to use a selective black surface which has a low emittance "E" at the operating temperature, but a high absorbance "α" to solar radiation. Many methods are described in the literature for producing such surfaces, and emittance values of the order of 0.2 or less are readily obtained commercially. Under these circumstances, the major heat loss from the absorber is by convection, with thermal radiation playing a small role. To reduce convection heat loss, it would be desirable to evacuate the space between the absorber and its nearest envelope. For moderate vacuum, the convection in the air can be suppressed but conduction remains. However, if the vacuum is high so that the free path of the air molecules is large compared with gap dimensions between the absorber and its nearest envelope, then the air conduction loss can also be reduced to a very low value, so that the thermal radiation loss then becomes the major item.

It is not very practical to draw a vacuum on a flat plate solar collector, but if the envelope is cylindrical (and preferably made of glass) the system becomes practical. It has therefore been proposed to construct a solar collector comprising a cylindrical glass tube within which is mounted, approximately in a diametral plane and not touching the tube walls, a selectively blackened absorber in the form of a substantially flat plate with a tubular passage for conducting a heat transfer fluid such as water, oil, or air. Since the rear side of the absorber plate does not "see" the sky, the rear part of the glass tube is silvered to reduce, to very low levels, the residual thermal radiation from the back of the receiver to the glass envelope.

One of the major disadvantages of such a system is the sealing of the absorber tube to the envelope, this requiring a graded metal-glass seal. Another disadvantage is that the rear of the absorber plays only a negative role in the system: it collects no solar heat but is subject to some thermal losses of its own.

SUMMARY OF THE INVENTION

In the present invention, virtually the entire system is made of cylindrical form. The absorber is preferably a circular glass tube suitably selectively blackened on its outer surface. One end of the absorber tube is closed. The absorber is mounted inside a radiation-transparent tubular housing of slightly larger dimensions with a small space between them. The open end is fused into one end of the envelope tube; the other end of the envelope tube is closed off. A high vacuum is produced in the space between the two tubes and sealed off.

We now have a system resembling a dewar flask except that the outer tube is not silvered but the inner tube does have a low emittance surface. One method of producing this high α, low E surface on the absorber is first to coat the glass with a metal layer as a low emissivity base upon which a selective black absorbing coating is to be superimposed. It has been found that the use of chemically deposited silver, using the classical chemical silvering methods, produces coatings in general much more adherent than other metallic coatings applied to glass particularly when the effects of thermal expansion are taken into account. The preferred selective black coating is an electro-deposited black nickel layer using solutions and procedures described in the literature, such as Israel Pat. No. 8678 or "Low Temperature Engineering Application of Solar Energy" ASHRAE publication New York, 1967, p. 51. Values of E of about 0.08 with values of α of about 0.9 are readily obtained.

By plugging the open end of the absorber tube with a cork or stopper having two holes, one for an inlet tube that extends to near the bottom end of the absorber tube, and one for an outlet tube, fluid may be pumped into the absorber and removed from it for purposes of extracting heat from the interior of the absorber.

According to one aspect of the invention, therefore, there is provided a solar collector comprising: a tubular housing of radiation-transparent material hermetically closed at one end; a smaller-diameter tubular absorber having a radiation-absorbing surface, the absorber being coaxially disposed within the tubular housing and hermetically closed at one end; the opposite ends of the tubular housing and absorber being sealed together, and the space between the two being evacuated; and heat-extracting means for passing a heat-exchange medium through said opposite end of the tubular absorber into the interior thereof to extract heat therefrom. More particularly, the heat-extracting means comprises a plug inserted into the opposite end of the tubular absorber where sealed to the tubular housing, and inlet tube passing through the plug for introducing a heat-exchange medium into the interior of the tubular absorber, and an outlet tube passing through the plug for removing the heat-exchange medium from the interior of the tubular absorber.

According to a still further feature, means are provided for mounting the collector at a tilt to the horizontal plane, with said opposite end of the tubular absorber carrying the plug being at a higher level than said one end.

According to a still further feature, the tubular housing is completely transparent, and the collector includes an albedo board underlying the tubular absorber and the tubular housing to reflect additional radiation to the underside of the tubular absorber.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
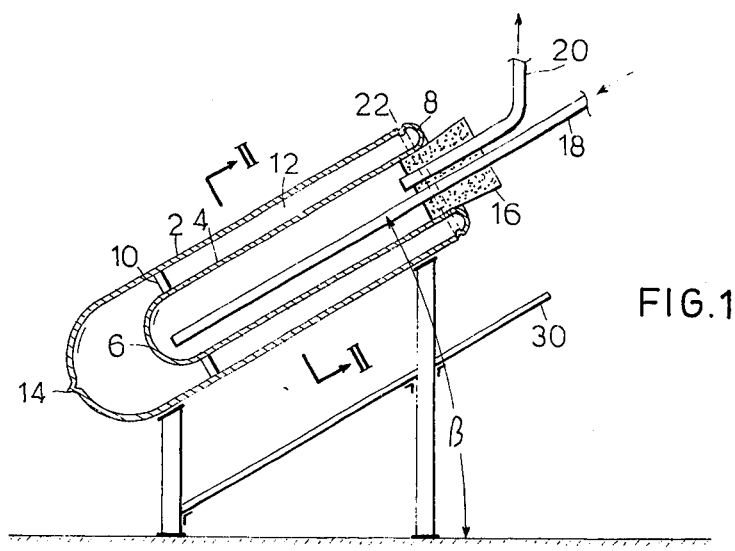
FIG. 1 is a longitudinal sectional view illustrating one form of solar collector constructed in accordance with the invention.
Figure 2:
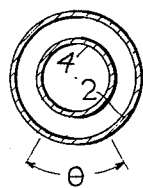
FIG. 2 is a transverse sectional view along lines II—II of FIG. 1.

With reference first to FIGS. 1 and 2, there is shown an evacuated cylindrical collector constructed in accordance with the invention. The collector includes an outer glass tube 2 constituting the radiation-transparent housing, and an inner, smaller-diameter absorber tube 4 coaxially disposed with respect to tube 2. The inner tube 4 constitutes the absorber and includes a blackened radiation-absorbing outer surface. One end of tube 4 is hermetically closed, as shown at 6, and the opposite end of the tube is sealed to the outer tube 2 at 8. An annular supporting ring 10 may be included to support the absorber tube 4 within the outer tube 2. The space 12 between the two tubes is evacuated to produce as high a vacuum as is practicable, for example $10^{-3}$ or higher and is then sealed off at the nipple 14.

The outer glass envelope 2 thus constitutes a radiation-transparent housing which permits the solar radiation to pass through and be absorbed by the radiation-absorbing surface of the tubular absorber 4, with heat loss from the absorber 4 via the transparent housing 2 being substantially reduced by the evacuated space 12.

FIG. 1 illustrates one technique that may be used for extracting the heat from the interior of the tubular absorber 4. For this purpose, the open end of the tubular absorber 4 is closed by a plug 16, such as a cork or rubber stopper. The plug is formed with two through-going holes, one of which receives an inlet tube 18 for a heat-exchange medium, and the other of which receives an outlet tube 20 for the heat-exchange medium. The inlet tube 18 extends through the plug 16 into the interior of the tubular absorber 4 for substantially the complete length of the absorber, and the outlet tube 20 extends through the plug but terminates at the entrance end of the absorber.

Figure 4:
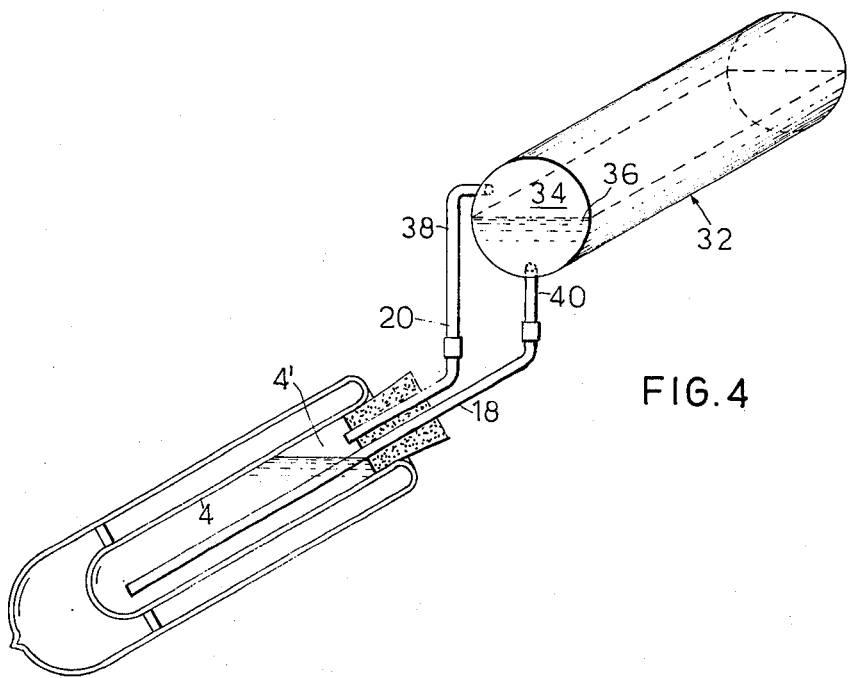
FIG. 4 illustrates a vapor-phase-pumping system that may be used for the extraction of heat from the solar collector of FIGS. 1 and 2.

Any suitable arrangement may be used for extracting the heat from the interior of absorber 4. For example, a fluid, such as water, may be pumped through inlet tube 18 to be heated by the heat absorbed from the solar radiations, the water leaving the absorber via outlet tube 20. A vapor-phase-pumping arrangement for extracting the heat is illustrated in FIG. 4 and is described more particularly below.

In order to firmly hold plug 16 within the open end of the tubular absorber 4, the outer face of the tubular housing 2 is preferably formed with an annular groove 22 for receiving a clamping ring (not shown), for example as commonly used to close-off the open end of a glass bottle.

A solar collector constructed as illustrated in FIG. 1 provides a number of important advantages. One advantage is that the single-ended arrangement for supporting the tubular absorber 4 simplifies the sealing problem during large temperature changes, since only one seal is required. In addition, by making the absorber as well as the transparent housing of cylindrical shape, they are both able to withstand a very high vacuum even when made of thin walls.

A further advantage in the construction illustrated is that the rear face of the absorber can be made to play a positive role, that is, to collect solar heat, rather than the negative role heretofore played by that surface in losing heat. This will be more readily apparent from the description below, particularly with reference to FIG. 3.

Figure 3:
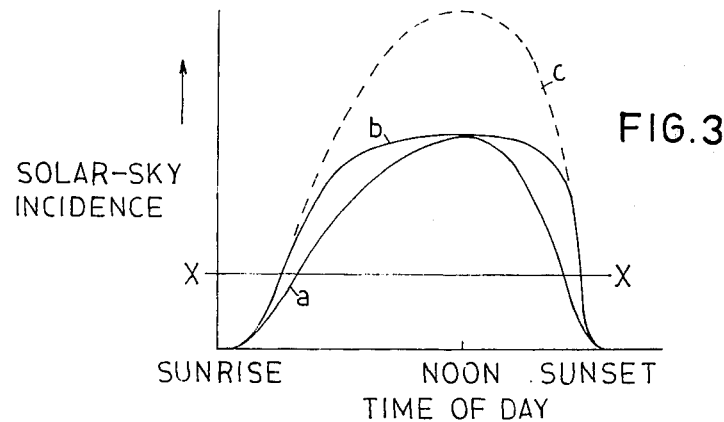
FIG. 3 is a diagram illustrating the variation of the incidence of solar radiation during the day, which diagram will be helpful in explaining an advantage of some of the aspects of the present invention.

If the collector is mounted in a vertical North-South plane and tilted to the horizontal and away from the equator, by an angle "$\beta$" where "$\beta$" is the local latitude, the collector is then parallel to the axis of rotation of the earth: this is usually called 'polar axis' mounting. Because the absorber is cylindrical and not flat, it "sees" the sun during the entire daylight hours, i.e., from horizon to horizon; the irradiated area is LD, where L is the length and D the diameter of the absorber tube. The incident energy (on a clear day) is thus close to that of normal incidence rather than that of incidence on a flat surface, i.e., the absorber "sees" about 50% more sunshine. This is shown in FIG. 3 where curve "$a$" is the incident radiation that would fall on a flat tilted absorber of width D and length L, and curve "$b$" is the incident radiation on a tilted cylinder of diameter D and length L. Against this, the cooling surface is $\pi$-times as great as for a flat plate of width D if the latter is perfectly insulated on the rear, or between 2-3 times as great if allowance is made for the fact that, in practice, the rear side of a flat absorber can never be perfectly insulated thermally. This larger cooling surface is the reason that this cylindrical absorber geometry has not been used in practical unevacuated collectors. However, for the evacuated selective collectors described herein with their very low thermal losses, the extra cooling area can be tolerated except for operation at temperatures so high that the thermal losses are a major part of the energy income.

Because the receiver is cylindrical, it also sees the ground. Therefore if the ground is made highly reflecting to sun and sky radiation, the collector will receive additional radiation. In practice, an artificial ground is generally used. This is simply an albedo board, i.e., a simple board of any convenient and durable material having a white upper surface and which is placed under the collector and some distance from it, and extending as far as possible in all directions, in particular in the direction normal to the plane of the diagram. The albedo board should not be too close to the collector, because of the effect of the shadow areas: the angle of view between two finite surfaces is greater when they are closer together so that the loss of illumination from the nearest shadow is more severe if it is very close. In practice the albedo board would be a distance D or more below the collectors: it does not have to be exactly parallel and in some cases could be, for example, a white painted horizontal roof of a building on which the collectors are mounted. In most installations there will be a number of collectors: these would be mounted parallel to one another and spaced apart by a distance which is generally between 2D and 3D. Very close spacing is to be avoided since each collector will then block off some of the radiation that its neighbors would otherwise receive.

FIG. 1 illustrates the use of an albedo board 30, and FIG. 3, curve "$c$", shows the incoming energy on the cylindrical absorber when the albedo board 30 is used. The extra energy income to the collector is considerable, at the small cost of adding the albedo board or white 'ground'. Since the collector will lose energy, which for a given temperature may be equivalent to an incidence at level XX, FIG. 3 (i.e., all energy below the line XX is lost) it can be seen that the useful energy above the XX line is far greater in the case of a cylinder (curve "$b$") than in the case of a flat plate (curve "$a$"), and far greater still in the case where the albedo board is used (curve "c").

In the system described, the collector is indicated as mounted on a polar axis, since this gives the maximum incidence on the equinox days and a nearly maximum on the solstice days. However, the tilt can be increased to favor the period of the year when the sun is low in the sky, or tilted to a lower angle to favor the period when the sun is higher in the sky, depending upon the application. If the collector is very long, it is often convenient to mount it substantially horizontally even if this does not result in the maximum incidence.

As indicated earlier, any suitable arrangement may be used for extracting the heat from the interior of absorber 4. FIG. 4 illustrates a vapor-phase-pumping arrangement, which is particularly attractive and simpler in execution than a "heat pipe", as no wick is involved.

In the arrangement illustrated in FIG. 4, the tubular absorber 4 is filled with a heating liquid, such as water, almost to the top, to provide a relatively small vapor-phase zone 4' at the upper end of the absorber. A boiler 32 is mounted at a higher elevation than the solar collector, and includes an upper vapor-phase zone 34 and a lower liquid-phase zone 36. The upper vapor-phase zone 34 is connected by a tube 38 to the outlet tube 20 of the solar collector, and the lower liquid-phase zone 36 is connected by a tube 40 to the inlet tube 18 of the solar collector.

The heat absorbed in the tubular absorber 4 of the solar collector causes the liquid therein to boil. Vapor passes from the vapor-phase 4' of the solar collector via tubes 20 and 38 to the vapor-phase zone 34 of the boiler 32. The liquid returns to the collector from the liquid-phase zone 36 of the boiler, via tubes 40 and 18, the lower end of tube 18 being below the liquid level within the absorber 4.

It will thus be seen that the solar collector and boiler 32 together constitute a vapor pump wherein heat is transferred from the solar collector to the boiler without the need for a mechanical pump. Boiler 32 may be in the form of a horizontal cylinder, and can be used to extract heat from a number of solar collectors in parallel.

Many variations, modifications and other applications of the illustrated embodiment may be made.

What is claimed is:

1. A solar collector, comprising: a tubular housing of radiation-transparent material hermetically closed at one end; a smaller-diameter tubular absorber having a radiation-absorber surface, the absorber being coaxially disposed within the tubular housing and hermetically closed at one end; the opposite ends of the tubular housing and absorber being sealed together by a fused seal, and the space between the two being evacuated; a plug inserted into said opposite end of the tubular absorber where sealed by the fused seal to the tubular housing; an inlet tube passing through an opening in said plug for introducing a heat-exchange medium into the interior of the tubular absorber; an outlet tube passing through an opening in said plug for removing the heat-exchange medium from the interior of the tubular absorber; means for mounting the collector at a tilt to the horizontal plane, with said opposite end of the tubular absorber carrying the plug being at a higher level than said one end; said inlet tube extending through the plug into the interior of the tubular absorber for substantially the complete length of the absorber; said outlet tube extending through the plug only into the upper end of the tubular absorber; and a boiler mounted at a higher elevation than the solar collector; the boiler including a vapour-phase zone connected to said outlet tube of the absorber, and a liquid-phase zone connected to the inlet tube of the absorber, the heated solar collector and boiler constituting a vapour pump whereby heat is transferred from the solar collector to the boiler without the need for a mechanical pump.

* * * * *